(12) United States Patent
Joe et al.

(10) Patent No.: US 8,811,035 B2
(45) Date of Patent: Aug. 19, 2014

(54) DOCKING STATION

(75) Inventors: Steven Joe, Coto de Caza, CA (US); Young Wen, Irvine, CA (US); Shawn Rogers, Anaheim, CA (US)

(73) Assignee: Zyxel Communications, Inc., Anaheim, CA (US)

( * ) Notice: Subject to any disclaimer, the term of this patent is extended or adjusted under 35 U.S.C. 154(b) by 259 days.

(21) Appl. No.: 13/364,141

(22) Filed: Feb. 1, 2012

(65) Prior Publication Data

US 2013/0194729 A1  Aug. 1, 2013

(51) Int. Cl.
*H02B 1/20* (2006.01)

(52) U.S. Cl.
USPC ............................ 361/826; 361/827; 710/303

(58) Field of Classification Search
CPC ..... G06F 21/34; G06F 1/1613; G06F 1/1632; H01R 13/72; H01R 13/60; H02J 7/0044; H02G 11/02
USPC .................................. 710/303; 361/826–827
See application file for complete search history.

(56) References Cited

U.S. PATENT DOCUMENTS

| | | | | |
|---|---|---|---|---|
| 5,056,698 A | * | 10/1991 | Kozakevich | 224/488 |
| 5,116,011 A | * | 5/1992 | Smith | 248/346.03 |
| 5,727,745 A | * | 3/1998 | Vara | 242/400.1 |
| 5,793,352 A | * | 8/1998 | Greenberg et al. | 345/699 |
| 5,984,224 A | * | 11/1999 | Yang | 242/400.1 |
| 6,329,597 B1 | * | 12/2001 | Kaloustian | 174/67 |
| 6,698,560 B2 | * | 3/2004 | Reardon et al. | 191/12 R |
| 6,926,130 B2 | * | 8/2005 | Skowronski | 191/12.2 R |
| 6,942,173 B1 | * | 9/2005 | Abramov | 242/400.1 |
| 7,231,481 B2 | * | 6/2007 | Scott et al. | 710/303 |
| 7,303,162 B2 | * | 12/2007 | Burke et al. | 242/405.2 |
| 7,502,225 B2 | * | 3/2009 | Solomon et al. | 361/679.41 |
| 7,679,902 B2 | * | 3/2010 | Thompson | 361/679.44 |
| 7,687,716 B2 | * | 3/2010 | Pepe et al. | 174/101 |
| D638,818 S | * | 5/2011 | Fleming et al. | D14/145 |
| 8,014,170 B2 | * | 9/2011 | Mori et al. | 361/826 |
| 8,045,552 B2 | * | 10/2011 | Unger | 370/389 |
| 8,260,998 B2 | * | 9/2012 | Ganesh et al. | 710/303 |
| 8,469,303 B2 | * | 6/2013 | Feldstein et al. | 242/388.9 |
| 8,601,195 B2 | * | 12/2013 | Smith | 710/303 |
| 8,601,520 B2 | * | 12/2013 | Yoshida et al. | 725/80 |
| 2001/0019002 A1 | * | 9/2001 | Walters et al. | 191/12.4 |
| 2005/0087311 A1 | * | 4/2005 | Franssen | 160/172 R |
| 2005/0101182 A1 | * | 5/2005 | Nakamura et al. | 439/529 |
| 2006/0011368 A1 | * | 1/2006 | Maruyama et al. | 174/33 |
| 2008/0168205 A1 | * | 7/2008 | McCoy et al. | 710/304 |
| 2008/0291324 A1 | * | 11/2008 | Hong et al. | 348/484 |
| 2010/0095041 A1 | * | 4/2010 | Bailey | 710/303 |
| 2011/0030025 A1 | * | 2/2011 | Bertonis et al. | 725/118 |
| 2012/0133328 A1 | * | 5/2012 | Chen | 320/115 |
| 2012/0190406 A1 | * | 7/2012 | Chen | 455/557 |
| 2013/0023312 A1 | * | 1/2013 | Staebler | 455/575.1 |

* cited by examiner

*Primary Examiner* — Paul R Myers
(74) *Attorney, Agent, or Firm* — Berkeley Law & Technology Group, LLP

(57) ABSTRACT

The subject matter disclosed herein relates to a charging docking station to wirelessly stream video from a smartphone and/or tablet computer to a remote receiver.

20 Claims, 4 Drawing Sheets

DOCKING STATION

FIELD

The subject matter disclosed herein relates to a charging docking station to wirelessly stream video from a smartphone and/or tablet computer to a remote receiver.

BACKGROUND

A smartphone may comprise a portable electronic device built on a mobile computing platform for personal telecommunications and/or computing. In addition to standard voice function, smartphones may support additional functions such as Short Message Service (SMS) for text messaging, email, packet switching for access to the Internet, and Multimedia Messaging Service (MMS) to send and receive photos and video, just to name a few examples. Because of their small size, mobile telephones may be preferred over other electronic devices such as a personal organizer, day planner, and/or personal planner.

A tablet computer may comprise another type of portable electronic device built on a mobile computing platform. A tablet computer may provide a platform for audio-visual media such as books, movies, music, games, and Internet content, just to name a few examples.

In addition to providing a stand for short-term storage, a docking station may be used to charge a smartphone, a tablet computer, or other device, for example.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
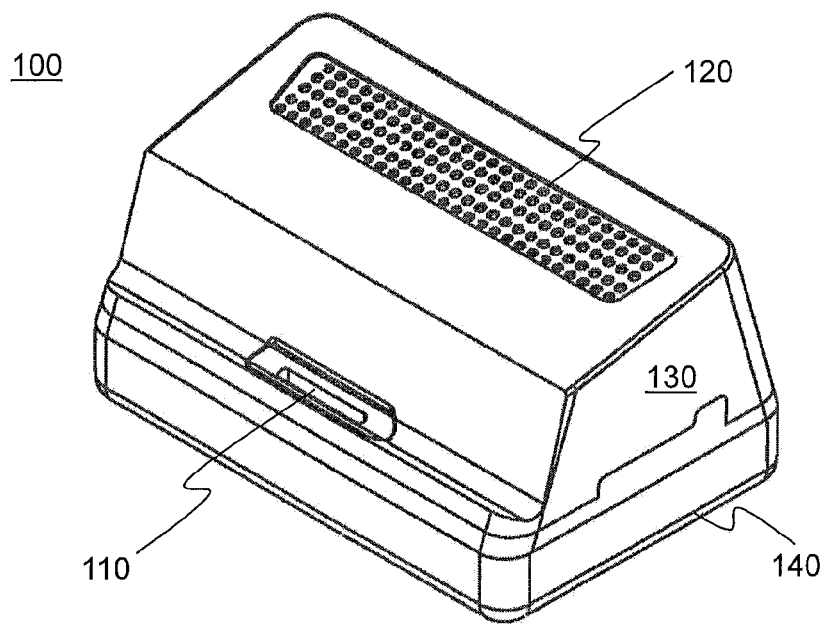
FIGS. 1, 2, and 3 show perspective, side, and front views, respectively, of a wireless docking station, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe relative positions and/or directions that do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to a particular axis while "vertical" may refer to an orientation parallel to the particular axis.

Embodiments described herein include a wireless docking station that may be used, for example, to charge a mobile device and/or to wirelessly transmit video signals generated by a mobile device. For example, a mobile device (e.g., a portable device) may comprise a smartphone, a tablet computer, or other portable computing device. Such a mobile device may include one or more rechargeable batteries, which may be recharged by a wireless docking station, according to an embodiment.

In some implementations, a mobile device may provide video signals to a wireless docking station, which in turn may wirelessly transmit such video signals (or other signals based, at least in part, on such video signals) to a receiver located remotely from the wireless docking station. Such a receiver may comprise a television, a monitor (e.g., a computer monitor), or other display device, just to name a few examples. In one implementation, wherein video signals comprise wireless high-definition (WiHD) streaming video, such a receiver may comprise a WiHD receiver and a wireless docking station may comprise a WiHD transmitter, though claimed subject matter is not so limited.

A wireless docking station need not be limited to wireless operations. For example, a wireless docking station may include a power cord to provide the docking station with electrical power from an alternating current (AC) power supply (e.g., wall outlet). Also, a wireless docking station may include a variety of electrical cables provided by a user to connect a mobile device to electronics included in the wireless docking station. In one implementation, a wireless docking station may include structural features to assist in organizing such electrical cables, as described below. A wireless docking station may comprise a structure that encloses and hides such electrical cables so as to provide an uncluttered-looking docking station, for example.

In an embodiment, a docking device may comprise a first connector for exchanging information with a mobile device, wherein the first connector may be user-interchangeable among connectors having different pin-outs. In such a fashion, the first connector may be interchangeable to accommodate two or more different types of mobile devices. For example, one mobile device may be configured according to one standard connection protocol while another mobile device may be configured according to another standard connection protocol, as explained in further detail below. A first connector comprising a first connector type may be removed and/or replaced with another connector type. "User-interchangeable" refers to an example where a user may perform connector removal and/or replacing operations. For example, a user-interchangeable connector may include a plug/socket for relatively simple connector removal and/or replacement. As a counter-example, a connector may not be user-interchangeable if such a connector is soldered and/or hardwired in place during manufacturing of a docking device.

A docking device may further comprise an interior region of the docking device. The interior region may include a slideable cable holder and one or more cable-wrapping posts to at least partially secure one or more electrical cables optionally connected to the first connector. "Optionally connected" means that such cables may be plugged or unplugged into or out of a connector by a user, for example. One example of "partially securing" an electrical cable may include the case where a portion of the cable is held in a clip or similar retaining device. Another example of "partially securing" an electrical cable, which may involve one or more cable-wrapping posts, explained in detail below, may include the case where the cable is at least partially wrapped around the posts. In this fashion, excess cable length may be wrapped around posts to be conveniently stored.

Figure 2:
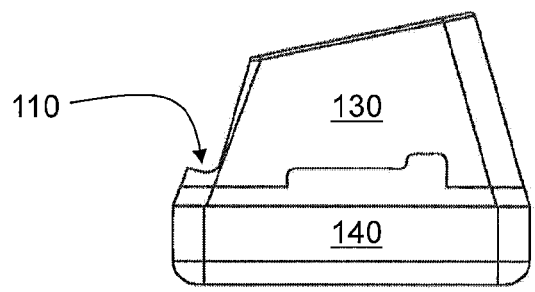
Figure 3:
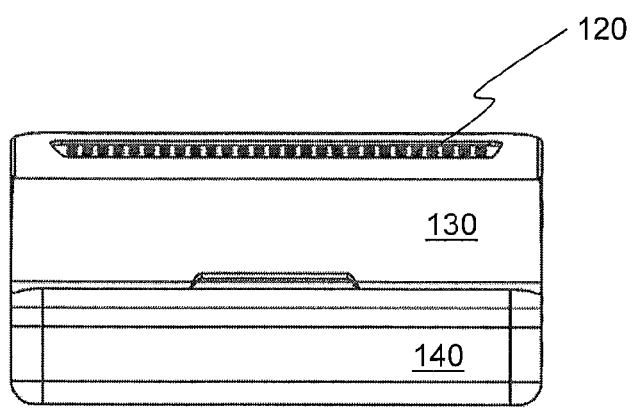

FIGS. 1, 2, and 3 show perspective, side, and front views, respectively, of a wireless docking station 100, according to an embodiment. Docking station 100 may comprise an upper portion 130, a lower portion 140, and a docking portion 110. Upper portion 130 may comprise a casing configured to mate with a casing of lower portion 140. Such casings may comprise any of a number of materials, such as plastic, metal, and so on. As explained in detail below, upper portion may include electronics that may generate heat and/or radio frequency (RF) signals. Accordingly, upper portion 130 may include opening portion 120 comprising multiple openings between exterior and interior of upper portion 130. As shown in detail below, lower portion 140 may include a number of physical attributes or configurations and/or cable connectors to accommodate one or more cables that may be added to docking station 100 by a user, for example. In an implementation, such cables may be concealed from points external to an assembled docking station 100.

Docking portion 110 may comprise a connector port that may be interchangeable to accommodate two or more different types of mobile devices. For example, one mobile device may be configured according to one standard connection while another mobile device may be configured according to another standard connection. One example of a standard connection includes a 30-pin iPOD connector used by a number of products (e.g., Apple iPod, Apple iPhone, and others) manufactured by Apple Incorporated, located in Cupertino, California. Another example of a standard connection includes a 14-pin Smartphone connector used by a number of mobile device manufactures. In one implementation, docking portion 110 may comprise an interchangeable plate or cover that may be selected among any of a number of plates or covers having different configurations. For example, different plates may include different numbers or shapes of openings to accommodate different cable-connectors (e.g., I-Pod or Smartphone connectors) for pass-through. In this context, "pass-through" means an opening in a surface (e.g., a plate or cover) that allows passage of a connector and/or cable. Of course, claimed subject matter is not limited to any particular standard connection.

In one implementation, docking portion 110 may comprise a pluggable connector that may be inserted or removed from a socket (e.g., socket 418 shown in FIG. 4) included in lower portion 140. For example, docking portion 110 may include a connector to accommodate (e.g., to receive a connection of) a first type of mobile device. Such a connector may be removed (e.g., unplugged) and replaced by another connector to accommodate a second type of mobile device. Claimed subject matter, however, is not limited in respect to such interchangeability or other example details of a docking station.

Figure 4:
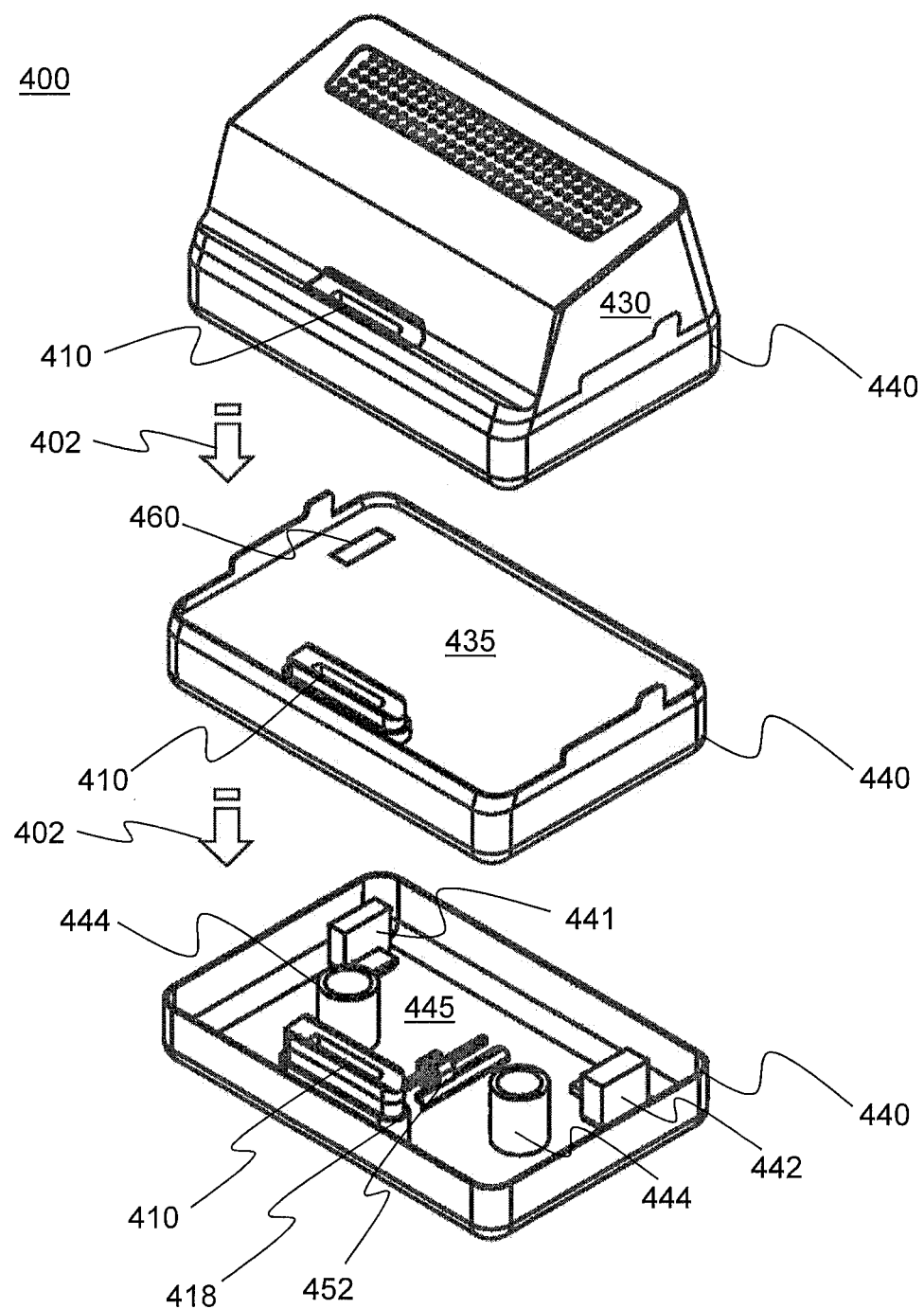
FIG. 4 includes perspective views of a wireless docking station showing several portions, according to an embodiment.

FIG. 4 includes perspective views of a wireless docking station 400 showing several portions, according to an embodiment. For example, docking station 400 comprises upper portion 430, lower portion 440, and docking portion 410. As indicated by arrows 402, upper and lower portions of docking station 400 may be separated from one another in a process of accessing a lower interior portion 445. (Upper and lower portions of docking station 400 may be assembled (or re-assembled) in a sequence that is reverse that of separating the portions.) For example, a user may access lower interior portion 445 to add/remove cables and/or change connections of one or more connectors located in lower interior portion 445. In one particular implementation, lower interior portion 445 may include a first connector 441 and a second connector 442, though claimed subject matter is not limited to any particular number of connectors. For example, first connector 441 may comprise a high-definition multimedia interface (HDMI) connector and second connector 442 may comprise a universal serial bus (USB) connector. In one implementation, electrical power may be provided to docking station 400 via a USB or tethering cable for a docked device. Accordingly, electrical power may be supplied to a docked device by first connector 441 or by second connector 442, for example. Again, claimed subject matter is not limited to any such details regarding particular connector types.

Lower interior portion 445 may also include cable-wrapping posts 444, which may comprise a physical structure around which one or more cables may be wrapped and/or tucked. Though cable-wrapping posts 444 may be shown having a cylindrical shape, cable-wrapping posts may have any number of shapes (e.g., rectangular, square, oval, hollow, tubular, solid, slender, broad, etc.) and/or sizes. Cable-wrapping posts 444 may comprise material that is the same as that used for casing material 446 of lower portion 440. For example, lower portion 440 and cable-wrapping posts 444 may be formed in a single mold process during manufacture.

Cable-wrapping posts 444 may add an element of convenience for creating or maintaining order and/or neatness of one or more cables that may be connected among first connector 441, second connector 442, and/or a connector included in docking portion 410, for example. Lower interior portion 445 may also include a slidable cable-holder 452, which may also add an element of convenience for creating or maintaining order and/or neatness of one or more cables. In one example, a cable connected to first connector 441 and a connector included in docking portion 410 may be at least partially held (e.g., clipped or snapped in place) by slidable cable-holder 452, as shown in detail below. Slidable cable-holder 452 may be slideably attached to a rail (e.g., 548, shown in FIG. 5) that allows cable-holder 452 to slide to any number of positions along the rail, as explained in detail below. Thus, such cable-holder 452 may be placed in a position that is relatively convenient based, at least in part, on a length or size of a cable that is connected to a connector included in docking portion 410.

A cover 435 may be used to cover lower interior portion 445. In one implementation, cover 435 may include an opening to allow at least a portion of a connector of docking portion 410 to protrude through. Cover 435 may also include an opening to allow at least a portion of first connector 441 to protrude through. Cover 435 may include other openings, and claimed subject matter is not so limited.

Though not shown, upper portion 430 may include electronic circuitry to wirelessly transmit video signals generated by a mobile device docked at docking portion 410. For example, a transmitter included in upper portion 430 may wirelessly transmit video signals to a receiver located at a television, a computer monitor, or other display device, just to name a few examples. Such a transmitter may comprise one or more antennas. In one implementation, video signals may comprise WiHD streaming video, though claimed subject matter is not so limited. In such a case, a transmitter may comprise a plurality of WiHD antennas. In another example, a transmitter included in upper portion 430 may wirelessly transmit audio signals to a receiver located externally to docking station 400.

Electronic circuitry located in upper portion 430 may include circuitry to receive and/or transmit electronic signals from/to cables located in lower portion 440 and/or connected to first connector 441, second connector 442, and/or a connector included in docking portion 410, for example.

Figure 5:
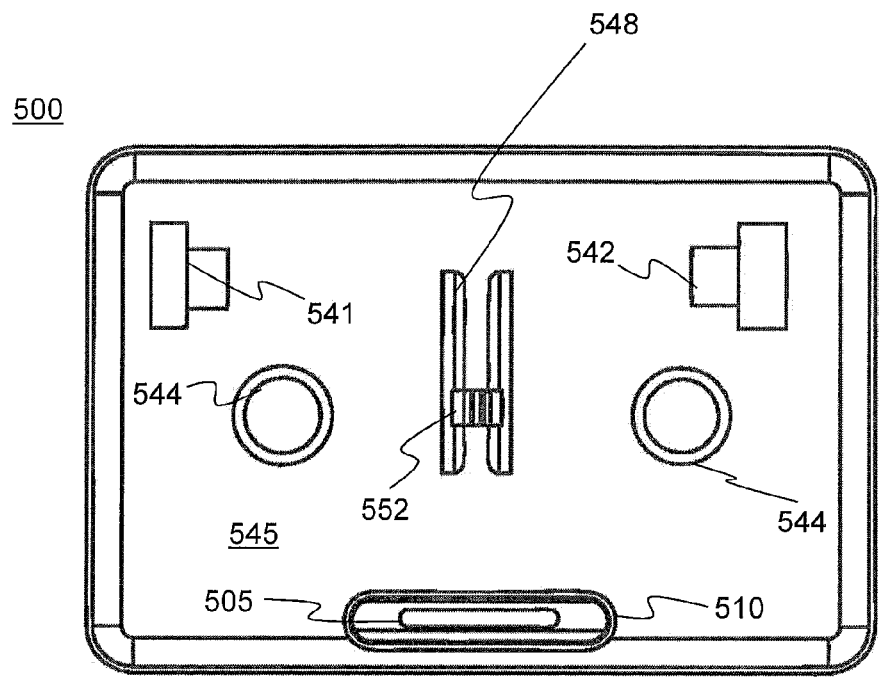
FIG. 5 shows a top view of an interior portion of a wireless docking station, according to an embodiment.

FIG. 5 shows a top view of an interior portion 545 of a wireless docking station, according to an embodiment 500. As mentioned above, interior portion 545 may include a first connector 541 and a second connector 542, though claimed subject matter is not limited to any particular number of connectors. For example, first connector 541 may comprise an HDMI connector and second connector 542 may comprise a USB connector. Again, claimed subject matter is not limited to any particular connector types. Interior portion 545 may also include cable-wrapping posts 544, which may comprise a physical structure around which one or more cables may be wrapped and/or tucked. As mentioned above, cable-wrapping posts 544 may add an element of convenience for creating or maintaining order and/or neatness of one or more cables that may be connected among first connector 541, second connector 542, and/or a connector 505 included in docking portion 510, for example. Interior portion 545 may also include a slidable cable-holder 552, which may also add an element of convenience for creating or maintaining order and/or neatness of one or more cables. Slidable cable-holder 552 may be slideably attached to a rail 548 that allows cable-holder 552 to slide to any number of positions along the rail.

Figure 6:
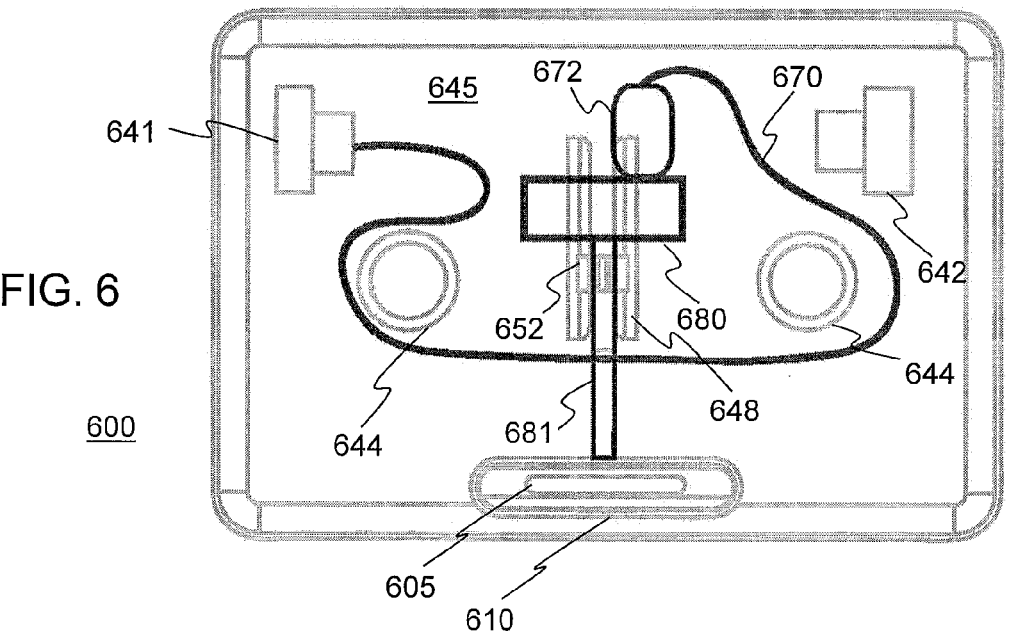
FIG. 6 shows a top view of an interior portion of a wireless docking station comprising a cable management system being used to guide several cables, according to an embodiment.

FIG. 6 shows a top view of an interior portion 645 of a wireless docking station comprising a cable management system being used to guide several cables, according to an embodiment 600. Interior portion 645 may be similar to interior portions 445 or 545 shown in FIGS. 4 and 5, respectively, though claimed subject matter is not so limited. Here, interior portion 645 is shown to include cables, which may be placed in the interior portion by a user, for example. Such cables are merely examples, and claimed subject matter is not limited to type, quantity, or any other detail regarding such cables. Interior portion 645 may include a first connector 641 and a second connector 642, though claimed subject matter is not limited to any particular number of connectors. For example, first connector 641 may comprise an HDMI connector and second connector 642 may comprise a USB connector, though claimed subject matter is not limited to any particular connector type. Interior portion 645 may also include cable-wrapping posts 644, which may comprise a physical structure around which one or more cables may be wrapped and/or tucked. A cable 670, which may comprise an HDMI cable, for example, may be connected to HDMI connector 641 and a connection module 672. Cable 670 may be wrapped and/or at least partially guided or conformed by one or more cable-wrapping posts 644, which may help to create or maintain order and/or neatness of cable 670 (e.g., and other cables), for example. A cable 681, which may comprise a particular cable that may be proprietary to a particular manufacturer, for example, may be connected to a cable module 672 (e.g., an adaptor between cable pin-outs of cable 681 and cable 670) and connector 605 of docking portion 610. In another implementation, cable 681 comprising an HDMI cable may be connected to HDMI connector 641. In yet another implementation, cable 681 comprising a USB cable may be connected to USB connector 642.

Slidable cable-holder 652 may help to create or maintain order and/or neatness by holding at least a portion of cable 681. Slidable cable-holder 652 may be slideably attached to a rail 648 that allows cable-holder 652 to slide to any number of positions along the rail to accommodate various lengths of cable 681. In one implementation, for a cable having a particular length, slidable cable-holder 652 may be moved to a convenient position for holding a portion of cable 681 and locked in that position by a tightening screw, clip, or other mechanical locking technique.

Figure 7:
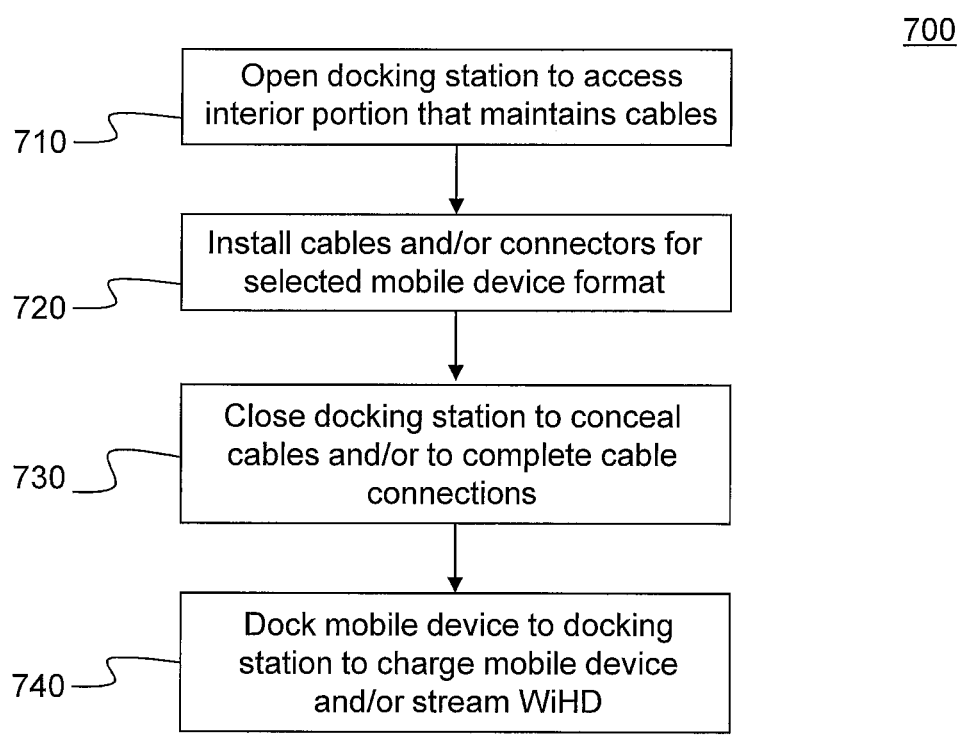
FIG. 7 is a flow diagram of a process to wirelessly stream video to a receiver, according to an embodiment.

FIG. 7 is a flow diagram of a process to set up a docking station and to wirelessly stream video to a receiver, according to an embodiment. Such a docking station may be similar to wireless docking station 400 described above and shown in FIG. 4, for example. At block 710, a docking station may be opened to access an interior portion of the docking station. For example, upper portion 430 may be separated from lower portion 440 and cover 435 (if present) may be removed to access interior portion 445. As described above, interior portion 445 may include one or more connectors to accommodate one or more cables. Cables may be inserted, removed, or interchanged, for example, to accommodate any of a number of types of mobile devices that are to use the docking station. Thus, at block 720, a user may install and/or remove one or more cables based, at least in part, on a type of mobile device that a docking station is to accommodate. For example, particular cables to accommodate an iPhone manufactured by Apple Inc. may be connected to appropriate connectors located in interior portion 445. On the other hand, cables that do not accommodate an iPhone may be disconnected and/or removed from interior portion 445.

Also at block 720, a user may install, remove, and/or replace one or more connectors in interior portion 445. For example, referring to embodiment 500 shown in FIG. 5, a particular type of connector 505 in docking portion 510 may be removed and replaced by another type of connector 505. In a particular example, a connector 505 that accommodates a Smartphone may be removed and replaced by a connector 505 that accommodates an iPhone if an iPhone is to be subsequently used with a docking station.

At block 730, a docking station may be closed by reassembling upper portion 430 with lower portion 440 to conceal cables from points outside interior portion 445. In an implementation, a process of reassembling upper portion 430 with lower portion 440 may include connecting connectors in interior portion 445 to plugs in upper portion 430. For example, connectors in interior portion 445 may comprise a female (or male) portion that plugs into a male (or female) portion of a corresponding connector in upper portion 430 during a process of reassembling upper portion 430 with lower portion 440. Further, such corresponding connectors in upper portion 430 may be connected to electronic circuitry included in upper portion 430, such as a transmitter to wirelessly transmit video signals generated by a mobile device docked at docking portion 410, as mentioned above. For example, electronic circuitry located in upper portion 430 may include circuitry to receive and/or transmit electronic signals from/to cables located in lower portion 440 via connectors that plug together upon a process of reassembling upper portion 430 with lower portion 440.

At block 740, a user may place (e.g., "dock") a mobile device in docking portion 410. Such a mobile device may comprise memory to store electronic signals and/or memory states that may be used to generate streaming WiHD video signals and/or audio signals. Electronic circuitry, which may be at least partially contained by upper portion 430, may generate such streaming WiHD signals and wirelessly transmit the WiHD signals to be available to a receiver located at a display device, for example. Batteries of a docked mobile device may be charged (or re-charged) whether or not a process of steaming WiHD video signals is occurring.

One skilled in the art will realize that a virtually unlimited number of variations to the above descriptions is possible, and that the examples and the accompanying figures are merely to illustrate one or more particular implementations.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A docking device comprising:
   a first interior portion comprising electronic circuitry to provide:
      wireless high definition (WiHD) transmission, and
      power to recharge a power supply of a portable device; and
   a second interior portion comprising:
      a casing including one or more cable-wrapping posts;
      an external port removeably attached to said casing, said external port to receive a cable to connect to a portable device;
      a first connector attached to said casing to connect to at least a portion of said cable and to at least a portion of said electronic circuitry;
      a rail connected to said casing; and
      a cable holder slide-ably attached to said rail for selective positioning along said rail, and for at least partially holding said cable at corresponding selected positions to accommodate various lengths of said cable.

2. The docking device of claim 1, wherein said first connector comprises a high-definition multimedia interface (HDMI) connector.

3. The docking device of claim 2, wherein said second interior portion further comprises a second connector, and wherein said second connector comprises a universal serial bus (USB) connector.

4. The docking device of claim 1, wherein said one or more cable-wrapping posts comprise tubes.

5. The docking device of claim wherein said electronic circuitry further provides audio signals.

6. The docking device of claim 1, wherein said electronic circuitry comprises WiHD antennas.

7. The docking device of claim 1, wherein said first interior portion further comprises a first casing configured to mate with said casing of said second interior portion.

8. The docking device of claim 7, wherein said first connector is configured to attach to an electronic plug while said first casing is mated with said casing of said second interior portion.

9. A docking device comprising:
   a first connector for exchanging information with a mobile device, wherein said first connector is user-interchangeable among connectors having different pin-outs;
   a second connector to transfer said information to electronic circuitry to provide wireless high definition (WiHD) transmission signals; and
   an interior region of said docking device at least partially defined by a casing, said interior region including: a rail coupled with said casing, a slideable cable holder slideably coupled with said rail for holding a portion of one or more electrical cables at two or more selected positions, and one or more cable-wrapping posts to at least partially secure said one or more electrical cables optionally connected to said first connector and/or said second connector.

10. The docking device of claim 9, further comprising circuitry to recharge a power supply of said mobile device.

11. The docking device of claim 9, wherein said second connector comprises a high-definition multimedia interface (HDMI) connector.

12. The docking device of claim 9, wherein said electronic circuitry further provides wireless audio signals.

13. The docking device of claim 9, wherein said electronic circuitry comprises a plurality of WiHD antennas.

14. A method of using a docking device with a mobile device, the method comprising:
   selecting one or more electrical cables based, at least in part, on type of said mobile device;
   connecting said one or more electrical cables to a first connector for exchanging information with said mobile device and a second connector for transferring said information to electronic circuitry to provide wireless high definition (WiHD) transmission signals;
   securing at least a portion of said one or more electrical cables by removeably attaching said one or more electrical cables to a slideable cable holder;
   positioning said slideable cable holder at selected position along a rail to which said slideable cable holder is in sliding engagement; and
   assembling an upper portion and a lower portion of said docking device to enclose said one or more electrical cables, said slideable cable holder, and one or more cable-wrapping posts.

15. The method of claim 14, wherein said one or more electrical cables comprise a high-definition multimedia interface (HDMI) cable or a universal serial bus (USB) cable.

16. The method of claim 14, wherein said upper portion of said docking device includes said electronic circuitry to provide WiHD transmission signals.

17. The method of claim 14, wherein said upper portion of said docking device includes circuitry to recharge a power supply of said mobile device.

18. The method of claim 14, further comprising:
docking said mobile device to said first connector to transfer said WiHD transmission signals from said mobile device to said docking device.

19. The method of claim 14, further comprising:
prior to said assembling said upper portion and said lower portion, wrapping said one or more electrical cables at least partially around said one or more cable-wrapping posts.

20. The method of claim 14, wherein said securing at least a portion of said one or more electrical cables includes:
securing said cable substantially at a middle portion of said cable spaced from a first end connected to said first connector and spaced from a second end connected to said second connector.

* * * * *